United States Patent [19]
Nerone et al.

[11] Patent Number: 6,057,648
[45] Date of Patent: May 2, 2000

[54] GAS DISCHARGE LAMP BALLAST WITH PIEZOELECTRIC TRANSFORMER

[75] Inventors: Louis R. Nerone, Brecksville; David J. Kachmarik, Strongsville, both of Ohio

[73] Assignee: General Electric Company, Schenectady, N.Y.

[21] Appl. No.: 09/139,311

[22] Filed: Aug. 25, 1998

[51] Int. Cl.$^7$ .................................................. H05B 37/02
[52] U.S. Cl. ...................... 315/209 R; 315/224; 315/225; 310/359
[58] Field of Search ................................ 315/209 R, 224, 315/225, DIG. 7; 310/359, 316

[56] References Cited

U.S. PATENT DOCUMENTS

| | | |
|---|---|---|
| 4,370,600 | 1/1983 | Zansky . |
| 4,463,286 | 7/1984 | Justice . |
| 4,546,290 | 10/1985 | Kerekes . |
| 4,588,925 | 5/1986 | Fahnrich et al. . |
| 4,614,897 | 9/1986 | Kumbatovic . |
| 4,647,817 | 3/1987 | Fahnrich et al. . |
| 4,677,345 | 6/1987 | Nilssen . |
| 4,692,667 | 9/1987 | Nilssen . |
| 4,937,470 | 6/1990 | Zeller . |
| 4,945,278 | 7/1990 | Chern . |
| 5,223,767 | 6/1993 | Kulka . |
| 5,309,062 | 5/1994 | Perkins et al. . |
| 5,341,068 | 8/1994 | Nerone . |
| 5,349,270 | 9/1994 | Roll et al. . |
| 5,355,055 | 10/1994 | Tary . |
| 5,387,847 | 2/1995 | Wood . |
| 5,406,177 | 4/1995 | Nerone . |
| 5,514,981 | 5/1996 | Tam et al. . |
| 5,705,879 | 1/1998 | Abe et al. ............................... 310/359 |
| 5,796,214 | 8/1998 | Nerone . |

FOREIGN PATENT DOCUMENTS 0 665 600 A1  8/1995  European Pat. Off. .

*Primary Examiner*—David H. Vu

[57] ABSTRACT

A ballast circuit for a gas discharge lamp includes a d.c.-to-a.c. converter circuit with circuitry for coupling to a load circuit, for inducing a.c. current therein. The converter circuit comprises a pair of switches serially connected between a bus conductor at a d.c. voltage and a reference conductor. The voltage between a reference node and a control node of each switch determines the conduction state of the associated switch. The respective reference nodes of the switches are connected together at a common node through which the a.c. current flows, and the respective control nodes of the switches are connected together. The load circuit has circuitry for connecting to a gas discharge lamp and comprises a piezoelectric transformer having a body and including a reference lead connected to one of the bus and reference conductors, an input lead coupled to the common node, and an output lead connected to the lamp. A circuit is provided for coupling to the control nodes a feedback signal representing current in the load circuit, for facilitating self-regenerative control of the switches.

8 Claims, 1 Drawing Sheet

GAS DISCHARGE LAMP BALLAST WITH PIEZOELECTRIC TRANSFORMER

FIELD OF THE INVENTION

The present invention relates to a ballast, or power supply circuit, for a gas discharge lamp of the type using gate drive circuitry to self-regeneratively control a pair of serially connected, complementary conduction-type switches of a d.c.-to-a.c. converter. More particularly, the invention relates to the use of a piezoelectric transformer rather than an inductive transformer in the ballast circuit.

BACKGROUND OF THE INVENTION

Co-pending application Ser. No. 08/897,345, filed on Jul. 21, 1997 by Louis R. Nerone, David J. Kachmarik and Michael M. Secen discloses a ballast for a gas discharge lamp of the type using gate drive circuitry to self-regeneratively control a pair of serially connected, complementary conduction-type switches of a d.c.-to-a.c. converter. The ballast includes a circuit for starting regenerative oscillation that is triggerless; that is, it does not include a device triggered into conduction when the voltage across it exceeds a threshold level.

The foregoing ballast includes an inductive-type transformer for setting the frequency of ballast oscillation. In some applications, it would be desirable to avoid the cost and expense of an inductive-type transformer.

SUMMARY OF THE INVENTION

An exemplary embodiment of the invention provides a ballast circuit for a gas discharge lamp including a d.c.-to-a.c. converter circuit with means for coupling to a load circuit, for inducing a.c. current therein. The converter circuit comprises a pair of switches serially connected between a bus conductor at a d.c. voltage and a reference conductor. The voltage between a reference node and a control node of each switch determines the conduction state of the associated switch. The respective reference nodes of the switches are connected together at a common node through which the a.c. current flows, and the respective control nodes of the switches are connected together. The load circuit has means for connecting to a gas discharge lamp and comprises a piezoelectric transformer having a body and including a reference lead connected to one of the bus and reference conductors, an input lead coupled to the common node, and an output lead connected to the lamp. A circuit is provided for coupling to the control nodes a feedback signal representing current in the load circuit, for facilitating self-regenerative control of the switches.

Beneficially, the foregoing embodiment does not employ an inductive-type transformer for setting the frequency of ballast operation. It, rather, employs a piezoelectric transformer to perform these functions, which can be smaller and less expensive than an inductive-type transformer. As such, the ballast can be configured with a low profile (i.e., thin and narrow), such as typically required in Notebook PCS.

DETAILED DESCRIPTION OF THE INVENTION

Figure 1:
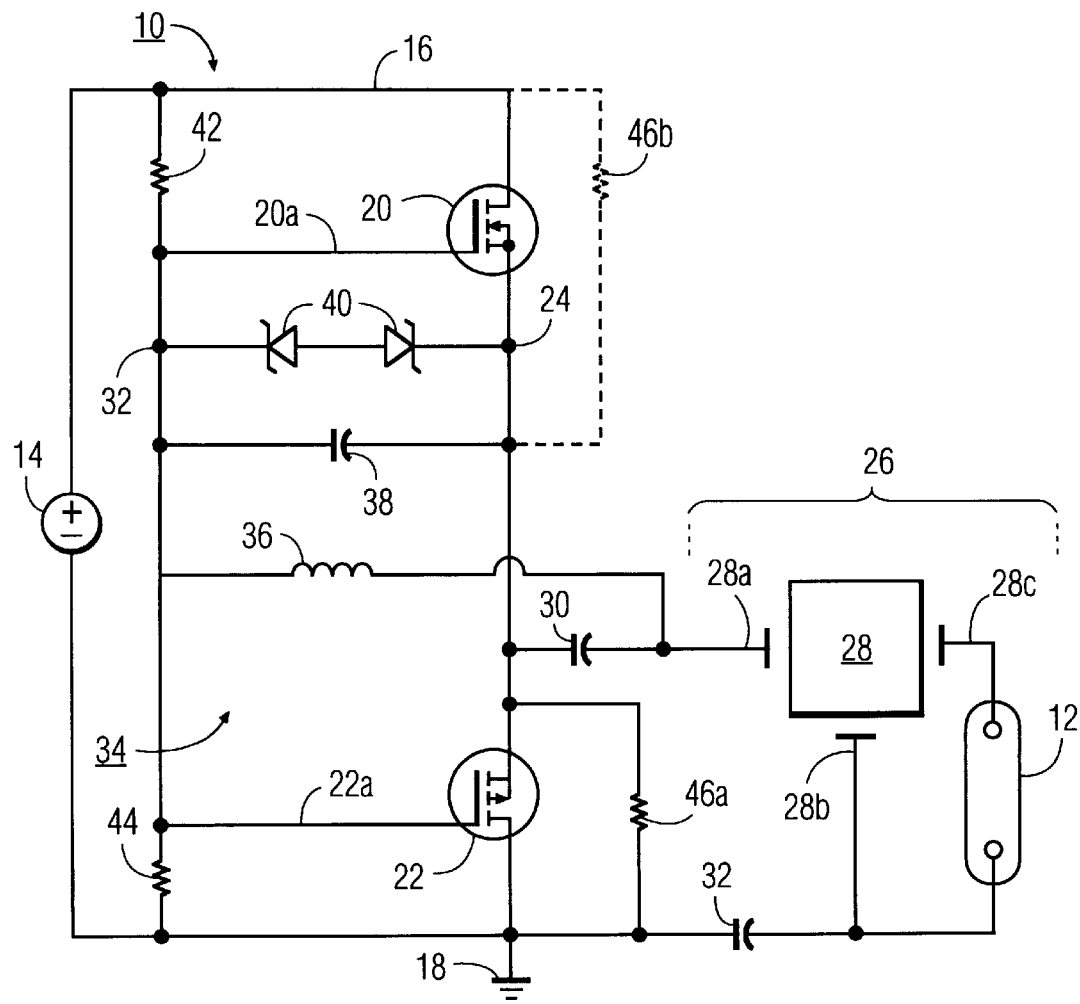
FIG. 1 is a schematic diagram, partially in block form, of a ballast circuit in accordance with the invention.

FIG. 1 shows a ballast circuit 10 in accordance with the present invention. A gas discharge lamp 12, such as a cold-cathode fluorescent lamp, is powered from a d.c. bus voltage provided by source 14 and existing between a bus conductor 16 and a reference conductor 18, after such voltage is converted to a.c. Switches 20 and 22, serially connected between conductors 16 and 18, are used in this conversion process. When the switches comprise n-channel and p-channel enhancement mode MOSFETs, respectively, the source electrodes of the switches are preferably connected directly together at a common node or conductor 24. The switches may comprise other devices having complementary conduction modes, such as PNP and NPN Bipolar Junction Transistors.

A load circuit 26 includes lamp 12 and a piezoelectric transformer 28, shown in simplified form. An input lead 28a to the transformer is coupled to common node 24 via a capacitor 30. A reference lead 28b is connected either to reference conductor 18 as shown, or to bus conductor 16. An output lead 28c supplies power to lamp 12. A d.c. blocking capacitor 32 is preferably used in load circuit 26.

Switches 20 and 22 cooperate to provide a.c. current from common node 24 to piezoelectric transformer 28. The gate, or control, electrodes 20a and 22a of the switches preferably are directly connected together at a control node or conductor 32. Gate drive circuitry, generally designated 34, is connected between nodes 32 and 24, for regeneratively controlling the switches. A feedback signal from the right-hand shown lead of capacitor 30 is coupled to control node 32, preferably via an inductor 36. In addition to providing the feedback signal, capacitor 30 is also used during circuit start-up, as described below.

A bidirectional voltage clamp 40 connected between nodes 24 and 32, such as the back-to-back Zener diodes shown, helps to cause the phase angle between the fundamental frequency component of voltage across load circuit 26 (e.g., from common node 24 to reference node 18) and the a.c. current in piezoelectric transformer 28 to approach zero during lamp ignition.

A capacitor 38 is preferably provided between nodes 24 and 32 to predictably limit the rate of change of control voltage between such nodes. This beneficially assures, for instance, a dead time interval during switching of switches 20 and 22 wherein both switches are off between the times of either switch being turned on.

Serially connected resistors 42 and 44 cooperate with a resistor 46a for starting regenerative operation of gate drive circuit 34. In the starting process, capacitor 30 becomes charged upon energizing of source 14, via resistors 42, 44 and 46a. Initially, the voltage across capacitor 30 is zero, and, during the starting process, inductor 36 provides a low impedance charging path. With resistors 42–46a being of equal value, for instance, the voltage on node 24, upon initial bus energizing, is approximately ⅓ of bus voltage 14, and the voltage at node 32, between resistors 42 and 44 is ⅓ bus voltage 14. In this manner, capacitor 30 becomes increasingly charged, from right to left as shown, until it reaches the threshold voltage of the gate-to-source voltage of upper switch 20 (e.g., 2–3 volts). At this point, the upper switch starts conducting, which then results in current being supplied by that switch to load circuit 26. In turn, the resulting current in the load circuit causes regenerative control of switches 20 and 22.

Typically, during steady state operation of ballast circuit 10, d.c. current is blocked from flowing through capacitor 30 due either to d.c. blocking capacitor 32, or internal d.c. blocking within piezoelectric transformer 28. This prevents capacitor 30 from building up a d.c. component of offset voltage that could prematurely turn on one of the switches.

Rather than using resistor 46a, a resistor 46b, shown in dashed lines, may be placed in shunt across switch 20 rather than across switch 22. The operation of the resulting circuit is similar to that described above with respect to resistor 46a shunting switch 22. However, initially, common node 24 assumes a higher potential than node 32, so that capacitor 30 becomes charged from left to right as shown. The results in an increasingly negative voltage between node 32 and node 24, which turns on switch 22 first.

Resistors 42 and 44 are both preferably used in the circuit of FIG. 1; however, the circuit functions substantially as intended with resistor 44 removed and using resistor 46a. Starting might be somewhat slower and at a higher line voltage. The circuit also functions substantially as intended with resistor 42 removed and using resistor 46b. Resistors 46a, 46b (polarity-determining impedance) set the initial polarity of pulse to be generated by capacitor 30.

By using piezoelectric transformer 28 instead of a conventional inductive-capacitive (L-C) network, a substantial savings in cost and size can be realized.

Figure 2:
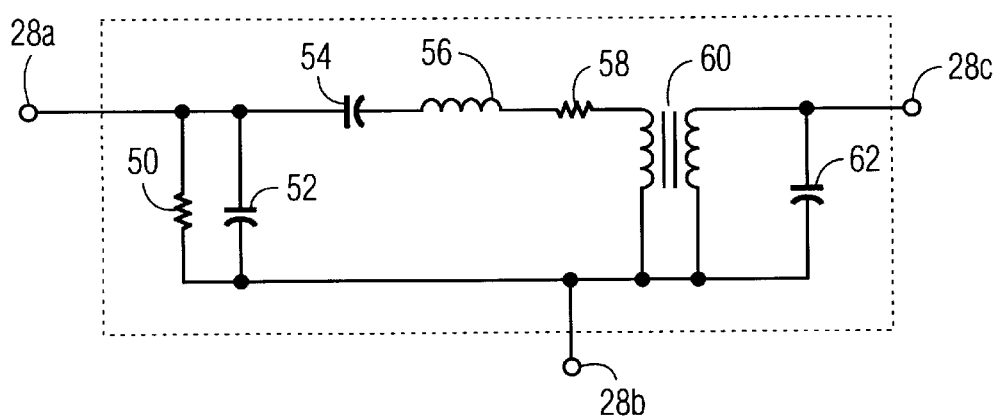
FIG. 2 is a schematic diagram of an equivalent electrical circuit for the piezoelectric transformer 28 of FIG. 1.

FIG. 2 shows an electrical equivalent circuit of the piezoelectric transformer 28 of FIG. 1. It includes a parallel resistance 50 and capacitance 52; a serially connected capacitance 54, inductance 56 and resistance 58, a transformer 60, and a capacitance 62. It can be used for specifying parameters of piezoelectric transformer 28. Capacitance 54 acts as a d.c. blocking capacitance internal to transformer 28. Once charged, it causes a deflective bias in the ceramic body of the piezoelectric transformer 28.

Exemplary component values for the circuit of FIG. 1 are as follows for a fluorescent lamp 12 rated at 7 watts, with a resistance of about 250 ohms, and with a d.c. bus voltage of 100 volts:

Driving capacitor 30 . . . 10 nanofarads
D.c. blocking capacitor 32 . . . 220 nanofarads
Capacitor 36 . . . 560 microhenries
Capacitor 38 . . . 1.5 nanofarads
Zener diodes 40, each . . . 10 volts
Resistors 42, 44 and 46a or 46b, each . . . 130 k ohms Additionally, piezoelectric transformer 28 may have a fundamental frequency of resonance of 200 kHz; and a small attenuation factor between input and output leads 28a and 28c to preserve efficiency. Selection of a suitable transformer will be obvious to those of ordinary skill in the art based on the present description.

Further, switch 20 may be an IRFR214, n-channel, enhancement mode MOSFET, sold by International Rectifier Company, of El Segundo, California; and switch 22, an IRFR9214, p-channel, enhancement mode MOSFET also sold by International Rectifier Company.

Additionally, exemplary values for the components of the circuit of FIG. 2 are as follows:

Resistance 50 . . . 1 Megohm
Capacitance 52 . . . 300 picofarads
Capacitance 54 . . . 1 nanofarad
Inductance 56 . . . 2.5 millihenries
Resistance 58 . . . 52 ohms
Turns ratio of transformer 60, right to left as shown . . . 1:1
Capacitance 62 . . . 620 picofarads While the invention has been described with respect to specific embodiments 30 by way of illustration, many modifications and changes will occur to those skilled in the art. For example, the various leads associated with transformer 28 can be multifaceted for accommodating a multi-layered transformer. It is therefore, to be understood that the appended claims are intended to cover all such modifications and changes as fall within the true spirit and scope of the invention.

What is claimed is:

1. A ballast circuit for a gas discharge lamp, comprising:
   (a) a d.c. to a.c. converter circuit with means for coupling to a load circuit, for inducing a.c. current therein, said converter circuit including:
      (i) a pair of switches serially connected between a bus conductor at a d.c. voltage and a reference conductor, the voltage between a reference node and control node of each switch determining the conduction state of the associated switch;
      (ii) the respective reference nodes of said switches being connected together at a common node through which said a.c. current flows, and the respective control nodes of said switches being connected together;
   (b) said load circuit having means for connecting to a gas discharge lamp and comprising a piezoelectric transformer having a body and including:
      (i) a reference lead connected to one of said bus and reference conductors;
      (ii) an input lead coupled to said common node; and
      (iii) an output lead connected to said lamp; and
   (c) a circuit for coupling to said control nodes of a feedback signal representing current in said load circuit, for facilitating self-regenerative control of said switches, said circuit for coupling including:
      (i) a capacitor having a first lead connected to said common node and a second lead connected to said input lead; and
      (ii) an inductor connected between said second lead and said control nodes.

2. The ballast circuit of claim 1, further comprising a bidirectional voltage clamp connected between said common node and said control nodes for limiting positive and negative excursions of voltage of said control nodes with respect to said common node.

3. The ballast circuit of claim 2, further comprising a capacitor connected between said common node and said control nodes for assuring a dead time interval during which both said first and second switches are off.

4. The ballast circuit of claim 1, wherein said feedback signal is proportional to said load current.

5. A ballast circuit for a gas discharge lamp, comprising:
   (a) a d.c.-to-a.c. converter circuit with means for coupling to a load circuit, for inducing a.c. current therein, said converter circuit comprising:
      (i) a pair of switches serially connected between a bus conductor at a d.c. voltage and a reference conductor, the voltage between a reference node and a control node of each switch determining the conduction state of the associated switch;
      (ii) the respective reference nodes of said switches being connected together at a common node through which said a.c. current flows, and the respective control nodes of said switches being connected together;
   (b) said load circuit having means for connecting to a gas discharge lamp and comprising a piezoelectric transformer having a body and including:
      (i) a reference lead connected to one of said bus and reference conductors;

(ii) an input lead coupled to said common node; and
(iii) an output lead connected to said lamp;
(c) a bidirectional voltage clamp connected between said common node and said control nodes for limiting positive and negative excursions of voltage of said control nodes with respect to said common node;
(d) a circuit for coupling to said control nodes a feedback signal representing current in said load circuit, for facilitating self-regenerative control of said switches; said circuit for coupling comprising:
  (i) a capacitor having a first lead connected to said common node and a second lead connected to said input lead; and
  (ii) an inductor connected between said second lead and said control nodes; and
(e) a network for supplying said capacitor with charge during lamp starting so as to create a pulse for starting one of said switches during lamp starting; said network including a polarity-determining impedance connected between said common node and one of said bus conductor and said reference conductor, to set the initial polarity of pulse to be generated by said capacitor.

6. The ballast circuit of claim 5, wherein said network comprises a voltage-divider network connected between said bus and reference conductors.

7. The ballast circuit of claim 5, further comprising a d.c. blocking means coupled to said capacitor to prevent its charging and consequent creating of a pulse for prematurely starting one of said switches during steady state operation.

8. The ballast circuit of claim 7, wherein said d.c. blocking means comprises substantially only internal d.c. blocking means in said piezoelectric transformer.

* * * * *